United States Patent [19]

Van Cleve

[11] Patent Number: 5,731,527

[45] Date of Patent: Mar. 24, 1998

[54] CORIOLIS FLOWMETERS USING FIBERS AND ANISOTROPIC MATERIAL TO CONTROL SELECTED VIBRATIONAL FLOWMETER CHARACTERISTICS

[75] Inventor: Craig Brainerd Van Cleve, Lyons, Colo.

[73] Assignee: Micro Motion, Inc., Boulder, Colo.

[21] Appl. No.: 718,276

[22] Filed: Sep. 20, 1996

[51] Int. Cl.$^6$ ........................................ G01F 1/84
[52] U.S. Cl. ............ 73/861.355; 138/172; 138/DIG. 2; 285/49
[58] Field of Search ............... 73/861.12, 861.355, 73/861.358; 285/49, 55; 138/172, 174, 177, DIG. 2

[56] References Cited

U.S. PATENT DOCUMENTS

| | | | |
|---|---|---|---|
| 4,003,252 | 1/1977 | Dewath | 73/861.27 |
| 4,676,276 | 6/1987 | Fawley | 138/172 |
| 5,110,644 | 5/1992 | Sparks et al. | 138/172 |
| 5,298,299 | 3/1994 | Shea | 138/172 |
| 5,363,929 | 11/1994 | Williams et al. | 175/107 |

OTHER PUBLICATIONS

Tsu–Wei Chou, et al.; Composites; pp. 193–203. Source of Publication Unknown.

*Primary Examiner*—Richard Chilcot
*Assistant Examiner*—Harshad Patel
*Attorney, Agent, or Firm*—Duft, Graziano & Forest, P.C.

[57] ABSTRACT

A Coriolis flowmeter whose flow tubes are made, at least part, of anisotrophic materials such as fiber reinforced composites. The composite material is formed by controllably orienting the fibers in one direction to increase the tensile strength of the material in that direction. Selected areas of the flow tubes are formed of this composite in order to increase the flowmeter sensitivity and to better separate the desired flowmeter vibrational frequencies from the undesired vibrational frequencies. Circumferentially oriented fibers increase the internal pressure containment capability of the flow tubes. A strain gauge affixed to the flow tube flexes with flow tube deformation to indicate the internal flow tube pressure.

26 Claims, 6 Drawing Sheets

CORIOLIS FLOWMETERS USING FIBERS AND ANISOTROPIC MATERIAL TO CONTROL SELECTED VIBRATIONAL FLOWMETER CHARACTERISTICS

FIELD OF THE INVENTION

This invention relates to Coriolis Flowmeters having flow tubes employing the use of fibers and composite materials to control flow tube vibrational characteristics including an increase in resistance to internal pressure as well as the flexibility of the flow tube walls.

PROBLEM

Vibrating tube Coriolis mass flowmeters traditionally comprise of one or more metal tubes (hereinafter tubes) through which material flows. These tubes are vibrated at their resonant frequencies to subject the flowing material to the Coriolis acceleration required to determine material mass flow rate and other information. Coriolis acceleration is achieved by subjecting the flowing material to an alternating angular velocity about a center axis of rotation. The Coriolis acceleration of the material is proportional to the flow tube vibration frequency, amplitude, and the material mass flow rate. The flow tubes are thereby subjected to a force proportional to the mass flow rate of the material and the vibration frequency. This force causes the tubes to deform so that any two points along a vibrating tube exhibit a phase difference that is used to determine the material mass flow rate within the tubes.

Flow tubes of Coriolis flowmeters have dual functions that impose conflicting requirements. The first function is that of material containment. The flow tubes must be strong enough to withstand the internal pressure of the flowing material. In many industrial applications this pressure can exceed one thousand pounds per square inch. Flow tubes having thick walls are required in such applications to withstand these high pressures.

The second function of the flow tubes is that they must be flexible so that they can readily respond to the generated Coriolis forces. The usefulness and sensitivity of a Coriolis mass flowmeter is dependent upon its ability to measure mass flow rates for a wide range of materials over a wide range of flow rates. A flowmeter should be able to function at low flow rates with materials having low densities such as gasses and low density fluids. A flowmeter can only do this if its tubes are flexible and deform in a predictable manner as in response to a wide range of applied Coriolis forces. A stiff flow tube that is optimized for high pressure material containment has poor flexibility and poor sensitivity to the measurement of material flow. This renders it unsuitable when the mass flow rate of material having a low flow rate or a low density is to be measured. Contrariwise, a flowmeter having thin flexible tube walls optimized for use with low density materials such as gasses or for low flow rates is unsuitable for use in containing high internal pressure.

Another problem of Coriolis flowmeters is their need for frequency separation between desired and undesired vibrational modes. Flow tubes (and the material therein) are vibrated at their resonant frequency to impart Coriolis acceleration to the flowing material. The material flow rate is derived by measuring the phase (or time) delay at a resonant frequency between two points on a single flow tube or between corresponding locations on a pair of flow tubes. It is important that the flow tube vibration be a pure sinusoidal function (with time) and that no other natural frequencies be present that are near the driven resonant frequency or near integer multiples of the resonant frequency. Extraneous natural frequencies can be excited by the drive frequency or by external ambient sources of vibration. These can generate undesired modes of vibration that cause flow tube deformations unrelated to the applied Coriolis forces. This can cause noisy and erroneous signals to be produced which interfere with the signal to be measured. This can degrade the accuracy of the derived mass flow rate information.

Vibrational frequency separation is traditionally achieved through the geometric design of the meter. Frequencies can be raised by shortening, stiffening, or reducing the mass of the vibrating members. Conversely, they can be lowered by performing the opposite. Unfortunately, there are some vibration modes that tend to track the driven mode. For instance, a flow tube that is bent into the shape of a "U" and is fixed at its ends is often driven in a vibration mode that is perpendicular to the plane of the legs of the "U". This drive mode is called the out-of-phase bending mode. One possible undesired vibration mode that occurs in the plane of the "U" is known as a lateral mode and it has a vibrational frequency very near to that of the desired drive mode. Changing the mass, length, or stiffness of the U-shaped flow tube moves the frequencies of both the desired and undesired vibration modes in unison and has little impact upon the separation of the frequencies of the desired and undesired modes.

SOLUTION

The present invention solves these problems and achieves an advance in the art by the provision of Coriolis flow tubes employing anisotropic materials such as fiber reinforced composites. Anisotropic materials are those whose mechanical properties vary with direction within the material. Modern composites can be made anisotropic by orienting strengthening fibers preferentially in one direction. The material will then have both a higher modules of elasticity (stiffness) and a higher tensile strength in that one direction.

The problem of containing high pressure material while providing sufficient flow tube flexibility for high Coriolis sensitivity is solved by orienting the majority of fibers of a composite flow tube in a circumferential orientation. The stress caused by internal pressure in a flow tube is twice as high in the circumferential direction (hoop stress) as it is in the axial direction. The bending stresses caused by the tube vibration are in the axial direction, but are by design much lower than hoop stress caused by pressure. Providing fibers primarily oriented in the circumferential direction results in a flow tube able to withstand greater pressure than a conventional isotropic flow tube but having good sensitivity to Coriolis forces.

The problem of frequency separation is also solved by the selective orientation and placement of fibers of the composite tube. When a tube is bent, the material on the convex side of the bend is stressed in tension while the material on the concave side of the tube is stressed in compression. There exists a region between the tensile and compressive stresses where the stress is zero. This region is the neutral plane of the tube. Placing stiffening fibers in the stressed regions parallel to the tube axis raises the tube natural frequency while placing fibers along the neutral axis has little effect. Thus, the problem of lateral mode vibration is easily solved by orienting fibers in the axial direction along the drive mode's neutral plane. This is also the lateral mode's region of highest stress. This placement does not raise the frequency of the drive mode or the flow tube's resistance to Coriolis forces; but it raises the lateral mode frequency and better separates the frequency of the lateral mode vibration from that of the drive mode.

Shifts in the frequencies of other vibrational modes are also achieved by the selective placement of fibers. In general, for a given mode, placement of fibers in the area of peak stress and oriented in the direction of the stress raises that mode's frequency.

Fiber reinforced composite products are manufactured in several ways. The most common methods are injection molding and extrusion. In both of these methods short fibers are mixed with molten matrix material which is then injection molded or extruded. The fibers are generally oriented parallel to the direction of flow of the defined material. In the case of an extruded flow tube, the fibers primarily have an axial orientation. This would not always suit our purpose. It does not raise the pressure containment rating of the tube because few fibers are in the circumferential direction. It also raises all bending frequencies equally.

The methods of manufacture that lend themselves to the precise placement of fibers in the flow tube wall all utilize an inner mandril. Fibers and matrix material are applied to the surface of the mandril. The mandril can either consist of a hollow tube which is left in place or a removable mandril. One method of fiber placement involves the use of prepregs. This term describes sheets of fiber (either unidirectional, bidirectional, or woven into cloth) which are impregnated with matrix material. These can be cut and oriented on the mandril. Baking fuses the sheets of prepreg together.

There also exists a continuous filament winding method. This involves winding a continuous filament (either a single fiber, multiple fibers, a yarn, or a prepreg) around a mandril. Machines can automatically wind filaments around complex shapes. Once the filament is in place on a flow tube or mandril, it is either coated with a liquid matrix material such as epoxy, or in the case of prepreg filament, it is baked. The solidified matrix material then holds the fibers in place. The filament winding method is ideal for the reinforcement of a flow tube in the circumferential direction. The mandril over which it is wound can be either removable, an extruded composite flow tube, or a thin walled metal flow tube of a corrosion resisting material such as stainless steel. Prepreg unidirectional tape can be placed between successive layers of wound filament so as to provide additional stiffness for the flow tube in the axial direction in strategic locations.

A hollow tube mandril has the advantage that it can consist of metal such as stainless steel, tantalum, or zirconium which is known for its corrosion resistance. It can thus serve as a corrosion resistant liner for the composite flow tube. The mandril tube wall can be thin so as to allow large response to the Coriolis forces while the tube's composite layer's circumferential fibers contain the internal pressure stresses. The tube mandril can also be of a non-metal material such as teflon for extreme sensitivity to flow while still retaining good corrosion resistance and pressure capability.

The mandril can also be removable leaving the flow tube without a liner. The corrosion resistant nature of many of the matrix materials make this adequate for many fluids. For a straight tube, the removable mandril (core) can be pulled out the end of the finished tube, but for curved tubes the core has to be removed by other means. The investment casting industry commonly uses removable cores made of special waxes that are strong yet can be melted out with hot water. These wax cores are usually made by injection molding.

The selective use of these materials as above described provides a Coriolis flow tube structure that overcomes the problems of the prior art and that achieves a high flowmeter sensitivity and a capability of accommodating higher material pressures.

DETAILED DESCRIPTION

Figure 1:
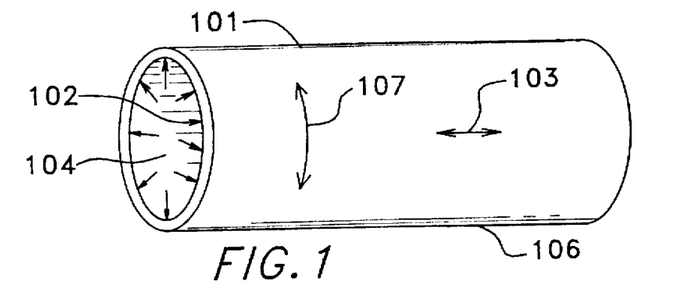
FIG. 1 discloses a straight flow tube.
Figure 2:
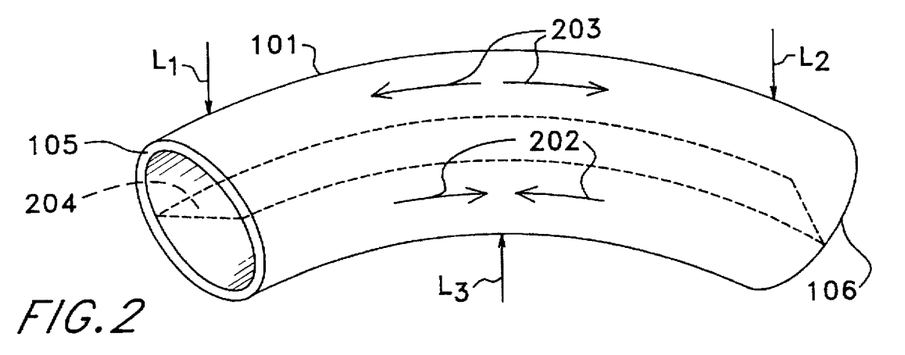
FIG. 2 discloses a bent flow tube.

DESCRIPTIONS OF FIGS. 1 AND 2

FIG. 1 illustrates the stresses that may be induced in a straight tube 101 having a pressurized interior portion 104. This interior pressure generates a radially oriented force 102 on side wall 106. Force 102 tends to push tube wall 106 outward and generates circumferential stress 107. The internal pressure can also generate an axially oriented stress 103. Circumferentially oriented stress 107 is approximately twice that of the axially oriented stress 103 for a given internal pressure.

FIG. 2 illustrates stresses that can be induced in tube 101 when it has bending loads L1, L2 and L3 applied to it. When the ends 105 and 106 of tube 101 are bent downward by L1 and L2 on FIG. 2, and upward by L3, tensile stress 203 is induced in the portion of the tube above the center plane 204 while compressive stress 202 is induced in the lower tube portion. Tensile stress 203 varies in magnitude from zero at the center (neutral) plane 204 to a maximum at the upper periphery of tube 101. Compressive stress 202 varies in magnitude from zero at center plane 204 to a maximum at the lower extremity of the tube 101.

The force 102 and stress 103 caused by the internal pressure of tube 101 are not shown on FIG. 2. However, if the tube of FIG. 2 is pressurized and bent, then both the pressure generated stresses 107 and 103, as well as the bending generated stresses 202 and 203, are present in the tube.

Figure 3:
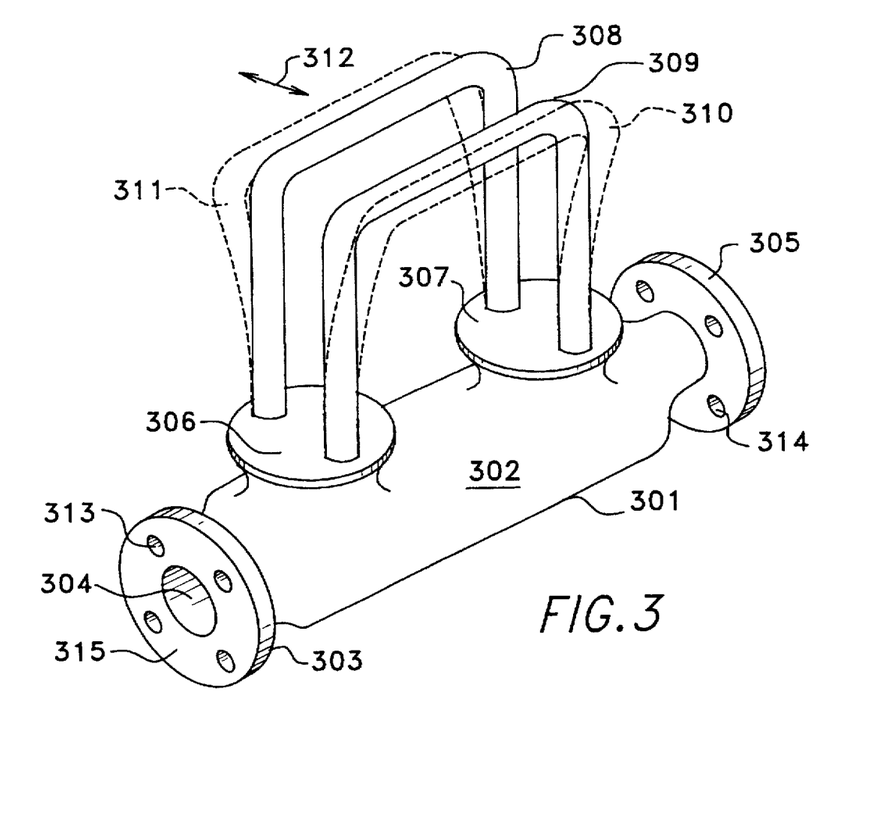
FIG. 3 discloses drive mode deflections of U-shaped flow tubes of a Coriolis flowmeter.
Figure 4:
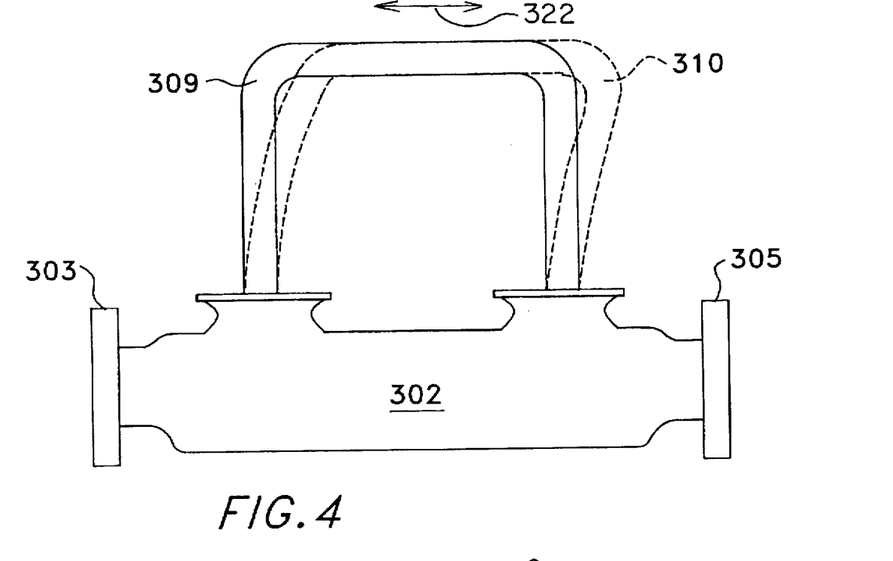
FIG. 4 discloses lateral deflections of U-shaped flow tubes of a Coriolis flowmeter.

DESCRIPTION OF FIGS. 3 AND 4

FIG. 3 discloses the deflections to which the flow tubes of a typical Coriolis flowmeter are subjected when in use. Flow tubes 308 and 309 are fixed at their lower leg extremities to circular faces of member 306 and 307 comprising a portion of the flow tube manifold 302. When in use, inlet flange 303 and its opening 304 are affixed by holes 313 and bolts (not shown) to a supply conduit (not shown) while outlet flange 305 is connected by bolts through holes 314 to an exit conduit (not shown). When in use, flow tubes 308 and 309 are deflected out of phase with respect to each other inwardly and outwardly along the direction of arrow 312. This deflection is generated by a driver similar to driver D shown on FIG. 5. This deflection causes the flow tubes to bend about a pivot point at surfaces 306 and 307 where their lower leg ends are attached to circular surfaces 306 and 307.

Flow tubes 308 and 309 assume an undeflected position as represented by their solid lines and a deflected position as shown by their dotted lines 310 and 311. The deflections of flow tubes 308 and 309 are termed the out-of-phase bending mode. The flow tubes must not be unduly stiff in their lower leg portions. If they were they would be unable to generate sufficient deflections in response to Coriolis forces for the flowmeter to perform its measurement functions. The measurement functions of the Coriolis flowmeter and its flow tubes 308 and 309 are performed by a left and a right sensor such as elements RS and LS of FIG. 5. These sensors, in a well known manner, detect the relative velocity of the two flow tubes with respect to each other. The phase difference of this velocity signal is proportional to the generated Coriolis forces and, in turn, to the flow rate of the material in the flow tubes.

FIG. 4 discloses the Coriolis flow tubes of FIG. 3 being subjected to lateral deflections in the direction shown by arrow 322. The solid line represents the normal and desired position of flow tube 309. Dotted line 310 represents one extremity of the undesired lateral vibration mode of flow tube 309. The out of phase bending deflections of FIG. 3 are a desirable vibration mode of the flow tubes. The lateral vibration mode of FIG. 4 is undesired and produces no useful information. This lateral vibration mode is induced in the flow tubes by undesirable factors such as noise and vibrations to which the Coriolis flowmeter 302 may be subjected to when in use.

Figure 5:
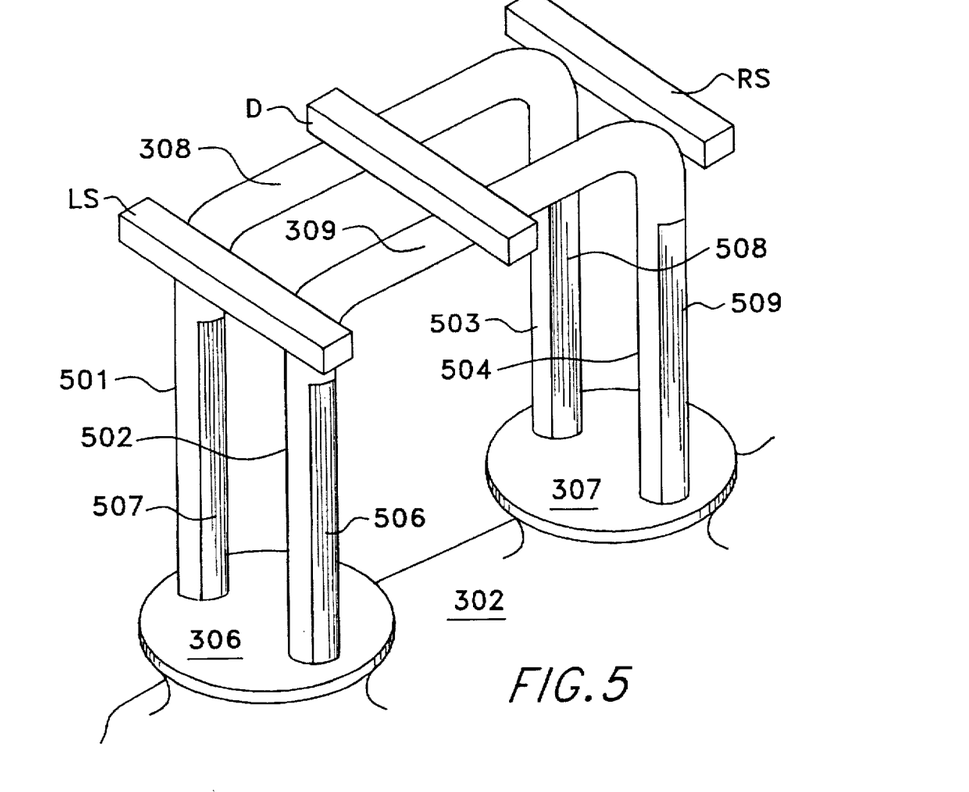
FIG. 5 discloses axially oriented fibers on the front and rear surfaces of the legs of U-shaped Coriolis flow tubes.

DESCRIPTION OF FIG. 5

The embodiment of FIG. 5 is similar to that of FIG. 3 except that the lower, front and rear (not shown) surfaces of legs 501 through 504 are covered with or include axially oriented fibers 506 through 509 extending from the lower extremities of the legs upwards along the length of the legs to a location proximate sensors LS and RS. The left legs 501 and 502 are covered on their front and rear surfaces with axially oriented fibers 506 and 507. Right legs 503 and 504 are covered on their front and rear surfaces with axially oriented fibers 508 and 509.

The axially oriented fibers 506, 507, 508 and 509 and the fibers (not shown) on the rear leg surfaces impart a stiffness to the legs. This increased leg stiffness raises the resonant frequency of flow tubes 308 and 309 for the out-of-phase bending (drive) mode. This increased resonant frequency is sometimes desirable to provide increased frequency separation between the drive frequency and the frequency of vibration generated by undesirable ambient conditions in which the flowmeter is operated such as frequencies generated by pumps, adjacent machinery and even the 50/60 Hz of AC power.

Figure 6:
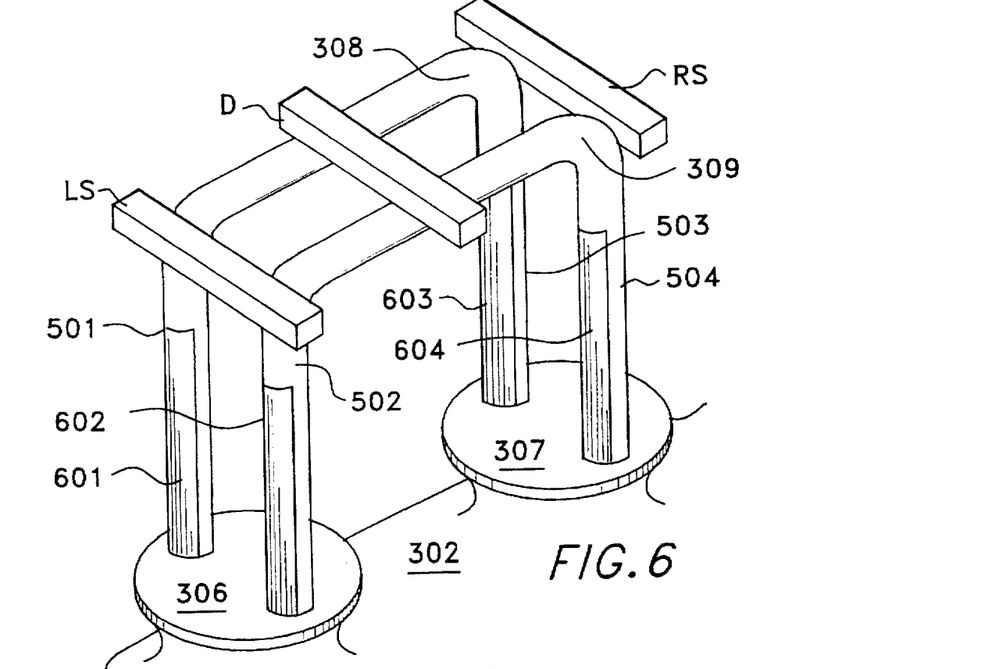
FIG. 6 discloses axially oriented fibers on the sides of the legs of U shaped Coriolis flow tubes.

DESCRIPTION OF FIG. 6

The embodiment of FIG. 6 is similar to that of FIG. 5 in that flow tubes 308 and 309 have side legs 501, 502, 503 and 504. The left side legs 501, 502 are embedded with or include axially oriented fibers 601 and 602 on their left side in addition to axially oriented fibers on their unseen right sides. The right side legs 503, 504 are formed with axially oriented fibers 603 and 604 on their left side as well as unseen fibers on their right sides. The axially oriented fibers of FIG. 6 increase the stiffness of the flow tube to lateral movement of the type shown in FIG. 4, but do not substantially increase the stiffness of the side legs with respect to out-of-phase bending deflections of the type shown in FIG. 3. Thus, the embodiment of FIG. 6 provides a flow tube structure that has increased lateral vibration frequency but that does not affect the vibrational frequency for out-of-phase bending. The fiber placement shown in FIG. 6 can increase the frequency separation between the drive and lateral deflection modes.

Figure 7:
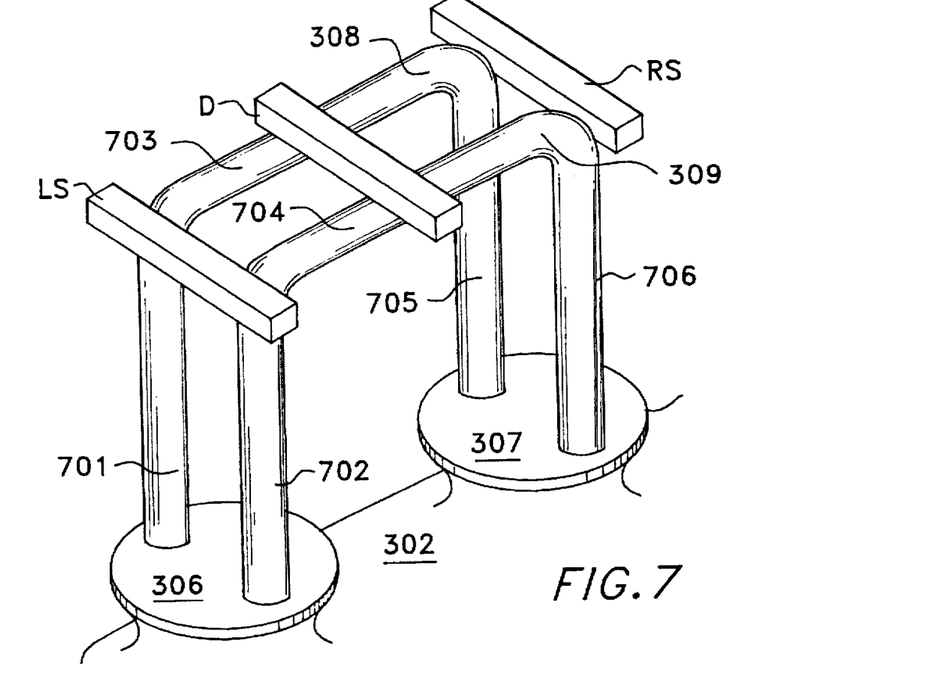
FIG. 7 discloses axially oriented fibers throughout the entirety of U shaped tubes of a Coriolis flowmeter.

DESCRIPTION OF FIG. 7

FIG. 7 discloses a pair of substantially U-shaped flow tubes 308 and 309 having axially oriented side leg fibers 701 and 702, top portion fibers 703 and 704, and right side leg fibers 705 and 706. These axially oriented fibers surround the entirety of flow tubes 308 and 309 and provide increases the stiffness to the flow tubes for all modes of vibration including the out-of-phase bending mode of FIGS. 3 and 5 as well as the lateral vibrational mode of FIG. 4. This configuration also increases the stiffness of the flow tubes with respect to the desired Coriolis forces generated in response to material flow through the tubes as they are vibrated. This increased stiffness is sometimes desirable to provide a higher drive frequency as well as to fine tune the operational frequencies of the flow tubes to controllably separate the desirable operational frequencies from the undesirable frequencies imparted by noise, surrounding machinery, etc.

Figure 8:
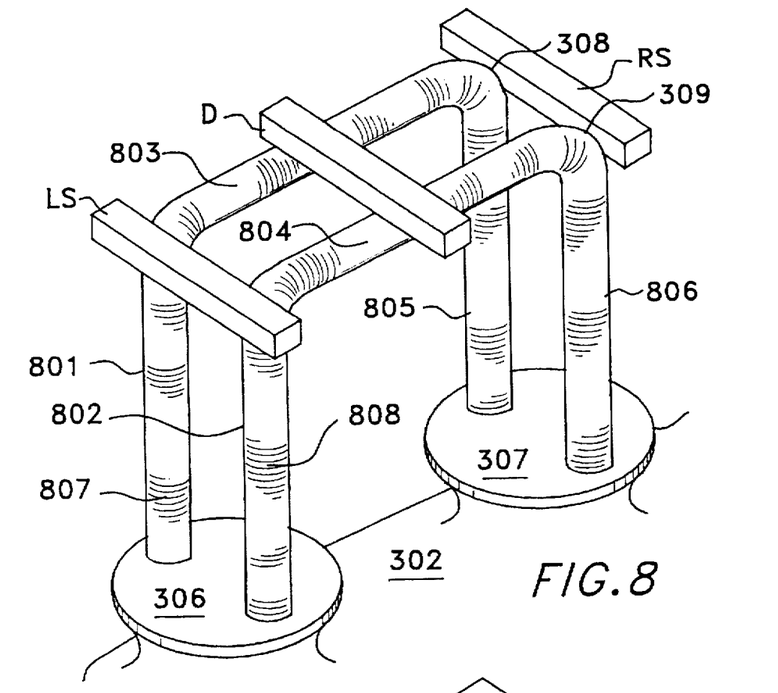
FIG. 8 discloses circumferentially oriented fibers throughout the entirety of U shaped flow tubes of a Coriolis flowmeter.

DESCRIPTION OF FIG. 8

FIG. 8 discloses flow tubes 308 and 309 covered in their entirety by fibers 807, 808 circumferentially oriented with respect to the longitudinal axis of the flow tubes. The circumferential orientation of the fibers has a limited effect on the stiffness of the tubes with respect to any type of bending. The main purpose served by the fibers 807, 808 is to increase the capability of the walls of flow tubes 308 and 309 to contain higher internal pressures than would be the case for a flow tube of the same wall thickness but not containing the circumferentially oriented fibers. This enables flow tubes to be used that have thin flexible walls and enhanced sensitivity to the Coriolis forces. Since the circumferentially oriented fibers 807, 808 have only a limited effect on bending stiffness, flow tubes 308, 309 have a high flexing capability while being able to contain higher internal pressures.

Figure 9:
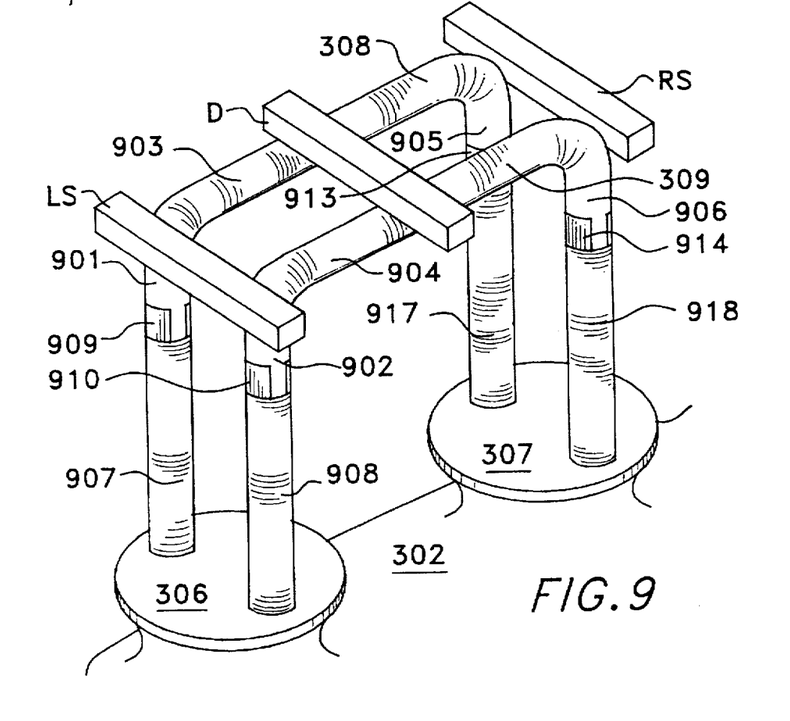
FIG. 9 discloses Coriolis flow tubes having both axially and circumferentially oriented fibers.

DESCRIPTION OF FIG. 9

FIG. 9 discloses a pair of U-shaped flow tubes 308 and 309 whose left side legs 901 and 902 and right side legs 905 and 906 have axially oriented fibers 909, 910 and 913, 914. The entirety of tubes 308 and 309 include circumferentially oriented fibers 907, 908 and 917, 918.

The axially oriented fibers stiffen the side legs for lateral bending as shown for the embodiment of FIG. 6. This raises the resonant frequency of the flow tubes for lateral bending mode vibrations. The circumferentially oriented fibers provide a pressure containment enhancement function and a limited amount of increased stiffness.

Figure 10:
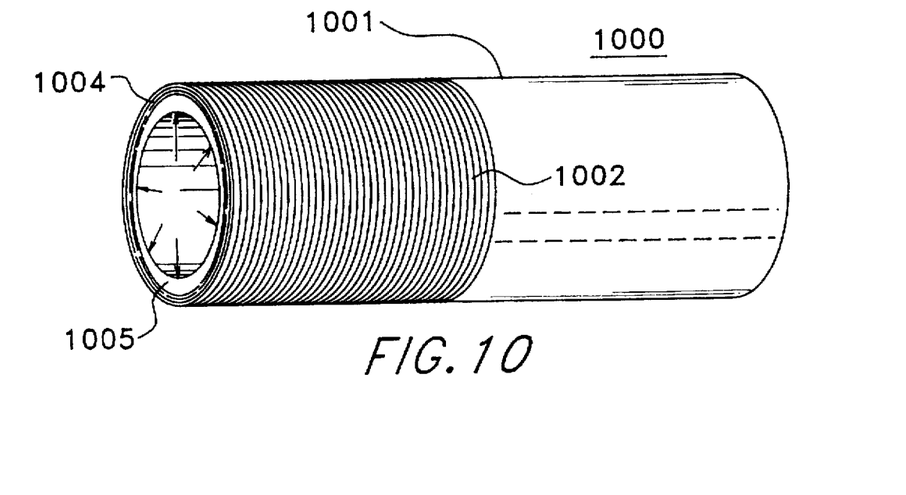
FIG. 10 discloses a, straight flow tube having circumferentially oriented fibers.

DESCRIPTION OF FIG. 10

FIG. 10 discloses a substantially straight flow tube 1000 whose outer wall surface 1001 includes multi-layer circumferentially oriented fibers 1002. Fibers 1002 provide increased pressure containment and a limited increased rigidity to the structure. A flow tube 1000 of increased sensitivity and increased side wall flexibility is achieved by making the isotropic portion 1005 of the side walls thin to achieve the desired flexibility. The layers 1004 of circumferentially oriented fibers 1002 affixed to portion 1005 provide a pressure containment function. If the internal pressure is relatively low, a single layer of fibers 1002 may suffice. Additional layers may be added to accommodate higher internal operating pressures.

Figure 11:
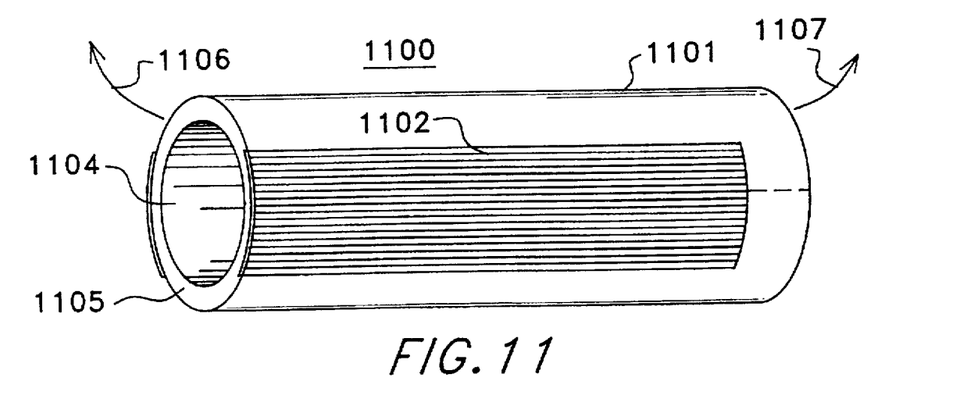
FIG. 11 discloses a flow tube having axially oriented fibers.

DESCRIPTION OF FIG. 11

FIG. 11 discloses a flow tube 1100 having a left end portion 1104, side walls 1105 and axially oriented fibers on the front and rear surfaces 1101 of the tube. The fibers on the rear portion of tube 1101 surface are not shown. The side walls 1105 alone provide a limited amount of resistance to a bending or deflection of the type shown in FIG. 2 in a direction as indicated by arrows 1106 and 1107. Fibers 1102 increase the side wall stiffness and thereby increase the resonant frequency of the tube in the direction perpendicular to the plane of the fibers 1102.

Figure 12:
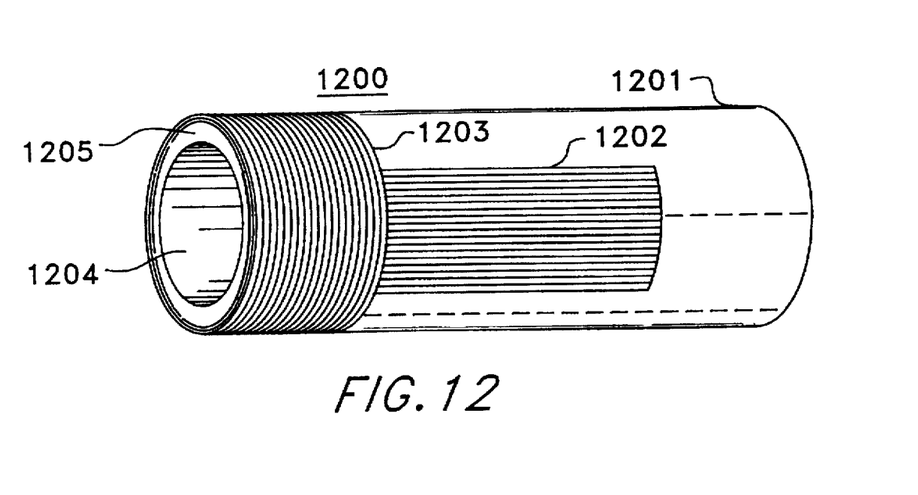
FIG. 12 discloses a flow tube having both axially and circumferentially oriented fibers.

DESCRIPTION OF FIG. 12

FIG. 12 shows a flow tube 1201 having a side wall 1205 and an end portion 1204 having axially oriented fibers 1202 and circumferentially oriented fibers 1203 affixed thereto. Side walls 1205 of tube 1200 provide an increased resistance to bending by an amount related to the thickness of the side walls. Side walls 1205 by themselves also provide a pressure containment function by an amount related to the thickness of the side walls and the material comprising the side walls. Additional pressure containment is provided by circumferentially oriented fibers 1203 which may include as many layers as may be desired to accommodate the expected working pressure to which tube 1200 is subjected. The axially oriented fibers 1202 impart an increased bending stiffness to the tube in a direction perpendicular to the plane of the fibers 1202. Fibers 1202 do not affect the flexibility of tube 1200 in so far as concerns bending in an up and down motion as shown on FIG. 12. However, fibers 1202 provide significant increased rigidity and resistance against tube bending in a direction perpendicular to the front and rear tube surfaces containing fibers 1202. The fibers on the back side of tube 1200 are not shown in FIG. 12.

Figure 13:
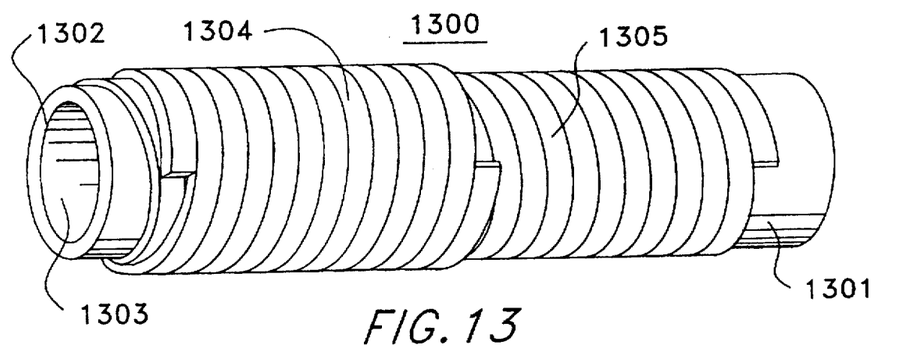
FIG. 13 discloses a flow tube having fibers oriented into a double helix.

DESCRIPTION OF FIG. 13

FIG. 13 shows a flow tube 1300 having a left end portion 1303 and a side wall 1302. Surface 1301 of the side wall includes or is covered with helically oriented fibers 1304 and 1305 comprising a double helix. The helically oriented fibers include a component in the circumferential direction as well as a component in the axial direction. Therefore, depending upon the angle of the helix, the fibers provide a pressure containment function due to their circumferential component as well as a stiffening function due to their axial component. The magnitude of the pressure containment function and the stiffening function can be controlled by the angle of the helix. This double helix prevents pressure or bending stresses from causing the tube to twist.

DESCRIPTION OF FIGS. 14 THROUGH 18

Figure 14:
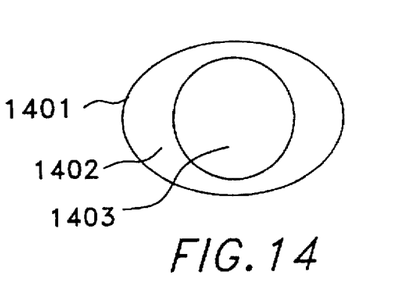
FIG. 14 discloses a flow tube having a circular interior and an oval exterior.
Figure 15:
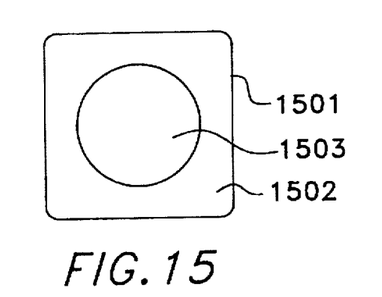
FIG. 15 discloses a flow tube having a circular interior and a rectangular exterior.
Figure 16:
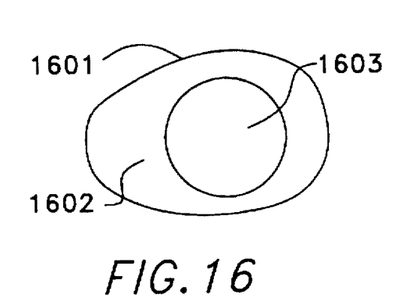
FIGS. 16 through 18 disclose flow tubes having irregularly shaped interiors and exteriors.

FIGS. 14 through 18 illustrate other flow tube configurations to which the principals of the invention may be applied. FIG. 14 illustrates an oval flow tube 1401 having a solid wall 1402 and a circular interior cross section 1403. FIG. 15 illustrates a rectangular flow tube 1501 having a solid wall 1502 and a circular interior 1503. FIG. 16 discloses a flow tube 1601 having an irregular shaped exterior having a solid body portion 1602 and a circular interior 1603.

Figure 17:
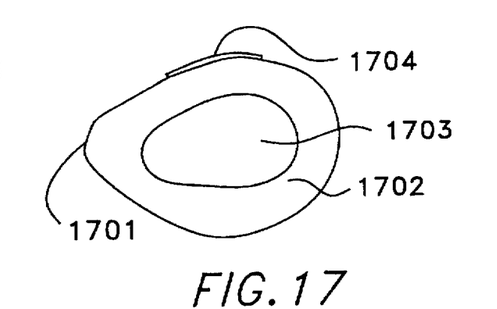
Figure 18:
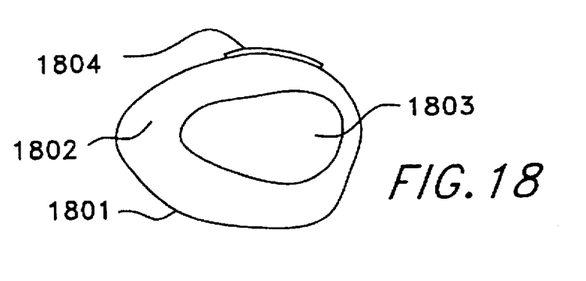

FIG. 17 discloses a flow tube 1701 having an irregular exterior wall portion 1702 and a hollow center 1703 having a width greater than its height. The flow tube on FIG. 18 is similar to that of FIG. 17 in that its external configuration of flow tube 1801 is irregular, it has a solid wall 1802 and an irregularly shaped hollow interior 1803 whose width is greater than its height.

Flow tubes 1701 and 1801 may be used with strain gauges 1704 and 1804 to measure their internal pressures. The operation is such that as the internal pressure increases, the height of the interior portion of the flow tubes expands and stresses the flow tube wall portions immediately above and below interior portions 1703 and 1803. Strain gauges 1704 and 1804 affixed to the flow tube walls detects the stress created by the walls deformation and generate output signals indicative of inner pressure. Wall elements 1702 and 1802 are advantageously geometrically designed so that the hollow interior 1703 and 1803 gradually approaches a circular shape, and the measured strain gradually increases with increasing internal pressure.

It is to be expressly understood that the claimed invention is not to be limited to the description of the preferred embodiment but encompasses other modifications and alterations within the scope and spirit of the inventive concept. For example, the principals of the invention are applicable to flowmeters having flow tube configurations of any type including straight, curved, U-shaped, V-shaped, irregular shaped, as well as the specific configurations disclosed herein. The principals of the invention are not limited to round flow tubes. They are equally applicable to flow tubes having a rectangular, triangular, or irregular shape.

We claim:

1. Flowmeter apparatus having flow tube means for receiving flowing material, said flow tube means being vibrated when in use and further being deformable in response to material flow while being vibrated, said flow tube means comprising;

a hollow member; and fibers comprising a part of said hollow member and oriented with respect to a longitudinal axis of said flow tube means to controllably alter selected vibrational characteristics of said flow tube means.

2. The apparatus of claim 1 wherein said fibers are circumferentially oriented with respect to the longitudinal axis of said hollow member;

said circumferential oriented fibers being effective to increase the internal pressure containment capability of said flow tube means as compared to that of said flow tube means when devoid of said fibers.

3. The apparatus of claim 1 wherein said fibers are oriented parallel to a longitudinal axis of said flow tube means.

4. The apparatus of claim 1 wherein said hollow member is cylindrical.

5. The apparatus of claim 1 wherein said hollow member comprises composite anisotropic material having said fibers embedded in a matrix material.

6. The apparatus of claim 5 wherein said fibers are oriented parallel to a longitudinal axis of said flow tube means to alter the vibrational characteristics of said flow tube means.

7. The apparatus of claim 6 wherein said fibers are uniformly positioned with respect to the length of said flow tube means.

8. The apparatus of claim 6 wherein said fibers are non uniformly positioned along the length of said flow tube means to controllably alter the vibrational characteristics of only a portion of said flow tube means.

9. The apparatus of claim 5 wherein said fibers are aligned circumferentially with respect to a longitudinal axis of said flow tube means;

said circumferentially oriented fibers being effective to increase the internal pressure containment capability of said flow tube means as compared to that of said flow tube means when devoid of said fibers.

10. The apparatus of claim 9 wherein said flow tube means further comprise fibers axially oriented with respect to the longitudinal axis of said flow tube means;

said axially oriented fibers being positioned with respect to portions of said flow tube means to controllably stiffen and raise the vibrational frequency of the portions of said flow tube means to which said axially oriented fibers are affixed.

11. The apparatus of claim 1 wherein said fibers are aligned helically with respect to the longitudinal axis of said flow tube means to control the pressure containment and vibrational characteristics of said flow tube means.

12. The apparatus of claim 1 wherein said hollow member comprises:

an inner sleeve; and an outer sleeve formed of composite anisotropic material containing said fibers.

13. The apparatus of claim 1 wherein said hollow member comprises:

an inner sleeve and an outer sleeve formed of composite anisotropic material having said fibers affixed to an outer surface of said outer sleeve.

14. The apparatus of claim 13 wherein said inner sleeve is formed of a solid material.

15. The apparatus of claim 14 wherein said inner sleeve is metal.

16. The apparatus of claim 1 wherein said flow tube means comprises a pair of substantially U-shaped tubes having substantially parallel longitudinal axes.

17. The apparatus of claim 16 wherein said fibers are oriented parallel to the longitudinal axis of said u-shaped tubes and are positioned only on legs of each of said U-shaped tubes;

said fibers being effective to stiffen and raise the vibrational frequency of the portions of said tubes containing said fibers.

18. The apparatus of claim 17 wherein said fibers are positioned only on front and rear surfaces of said legs of said U-shaped tubes;

said fibers being effective to stiffen and raise the out-of-phase bending vibrational frequency of the portion of said U-shaped tubes containing said fibers.

19. The apparatus of claim 16 wherein said fibers are circumferentially oriented to encase the entirety of said flow tube means;

said circumferentially oriented fibers being effective to increase the internal pressure containment capabilities of said flow tube means as compared to that of said flow tube means when devoid of fibers or having only axially oriented fibers.

20. The apparatus of claim 1 wherein said flow tube means comprises at least one partially curved tube.

21. The apparatus of claim 1 wherein said flow tube means comprises at least one substantially straight flow tube.

22. The apparatus of claim 21 wherein said fibers are axially oriented parallel to the longitudinal axis of said flow tube means;

said fibers being effective to stiffen and raise the vibrational frequency of the portion of said flow tube means containing said axially oriented fibers.

23. The apparatus of claim 21 wherein said fibers are oriented circumferentially to encase said flow tube means for substantially the length of said flow tube means;

said circumferentially oriented fibers being effective to increase the internal containment pressure that can be accommodated by said flow tube means.

24. The apparatus of claim 23 wherein said flow tube means further includes fibers oriented parallel to the longitudinal axis of said flow tube means;

said parallel oriented fibers being effective to stiffen and raise the vibrational frequency of said flow tube means.

25. The apparatus of claim 21 wherein said fibers are aligned helically with respect to the longitudinal axis of said flow tube means.

26. The apparatus of claim 1 wherein said apparatus further includes;

a strain gauge affixed to a surface of said flow tube means;

said strain gauge being responsive to internal pressure inside of said flow tube means to generate an output signal indicative of said internal pressure.

* * * * *